(12) United States Patent
Matsuyama et al.

(10) Patent No.: US 8,271,571 B2
(45) Date of Patent: Sep. 18, 2012

(54) MICROPROCESSOR

(75) Inventors: Hideki Matsuyama, Kanagawa (JP); Masayuki Daitou, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1022 days.

(21) Appl. No.: 12/232,072

(22) Filed: Sep. 10, 2008

(65) Prior Publication Data
US 2009/0077154 A1    Mar. 19, 2009

(30) Foreign Application Priority Data
Sep. 18, 2007    (JP) .................................. 2007-241583

(51) Int. Cl.
*G06F 7/52*    (2006.01)
(52) U.S. Cl. ....................................... 708/622
(58) Field of Classification Search .................. 708/511, 708/622
See application file for complete search history.

(56) References Cited

U.S. PATENT DOCUMENTS

| | | | | |
|---|---|---|---|---|
| 6,385,634 B1 * | 5/2002 | Peleg et al. | ................... | 708/490 |
| 6,385,635 B1 * | 5/2002 | Ishii | ............... | 708/603 |
| 6,411,979 B1 * | 6/2002 | Greenberger | ................. | 708/622 |
| 7,113,970 B2 * | 9/2006 | Chiueh et al. | ................. | 708/622 |
| 7,120,783 B2 | 10/2006 | Fotland et al. | | |
| 7,216,139 B2 * | 5/2007 | Langhammer et al. | ........ | 708/501 |
| 7,685,405 B1 * | 3/2010 | Chow et al. | ...................... | 712/35 |
| 2004/0015533 A1 * | 1/2004 | Hansen et al. | ................ | 708/523 |

FOREIGN PATENT DOCUMENTS

| | | |
|---|---|---|
| JP | 10-134032 | 5/1998 |
| JP | 2001-256038 A | 9/2001 |

OTHER PUBLICATIONS

"AltiVec Complex FIR", URL: http://www.freescale.com/webapp/sps/site/overview.jsp?code=DRPPCALTVCCFIR, Freescale Semiconductor, Inc., Oct. 28, 2002.
Japanese Office action dated Jul. 10, 2012 with a partial English translation thereof.

* cited by examiner

*Primary Examiner* — Chuong D Ngo
(74) *Attorney, Agent, or Firm* — McGinn IP Law Group, PLLC

(57) ABSTRACT

Provided is a microprocessor including a complex-MAC unit that operates in response to a complex-MAC instruction. The complex-MAC unit receives first and second complex data (each having $2^m$-bit length) from a first register having a register length of at least $2^{m+1}$ bits, and also receives third and fourth complex data (each having $2^m$-bit length) from a second register having a register length of at least $2^{m+1}$ bits, to calculate a sum of real parts or imaginary parts of a complex product of the first and third complex data and a complex product of the second and fourth complex data. The complex-MAC unit adds the obtained sum of the real parts or imaginary parts to a stored value of the third register, and overwrites the third register with the cumulative total value. The third register has a register length of at least $2^m+2$ bits.

3 Claims, 17 Drawing Sheets

| MAD_FNC[1] | MAD_FNC[0] | OUT |
|---|---|---|
| 0 | 0 | A + B |
| 0 | 1 | A − B |
| 1 | DON'T CARE | B − A |

$Y[0] = \underbrace{W[0]*X[0] + W[1]*X[1]}_{\text{FIRST STEP}} + \underbrace{W[2]*X[2] + W[3]*X[3]}_{\text{SECOND STEP}}$ $Y[1] = \underbrace{W[0]*X[1] + W[1]*X[2]}_{\text{THIRD STEP}} + \underbrace{W[2]*X[3] + W[3]*X[4]}_{\text{FOURTH STEP}}$ $Y[2] = W[0]*X[2] + W[1]*X[3] + W[2]*X[4] + W[3]*X[5]$ $Y[3] = W[0]*X[3] + W[1]*X[4] + W[2]*X[5] + W[3]*X[6]$

⋮

|  | S_ISEL | MAD_FNC[1:0] |
|---|---|---|
| INSTRUCTION 1: VCMADRE R2, R3, R0 | 0 | 01 |
| INSTRUCTION 2: VCMADIM R2, R3, R1 | 1 | 00 |
| INSTRUCTION 3: VCMADRE R4, R5, R0 | 0 | 01 |
| INSTRUCTION 4: VCMADIM R4, R5, R1 | 1 | 00 |

Fig. 7

|  | MAD_FNCL[1:0] | MAD_FNCR[1:0] |
|---|---|---|
| INSTRUCTION 1: VCMAD R2, R3, R0, R1 | 00 | 01 |
| INSTRUCTION 2: VCMAD R4, R5, R0, R1 | 00 | 01 |

Fig. 11

$$Y[0] = \underbrace{W[0]*X[0]}_{\text{FIRST STEP}} + \underbrace{W[1]*X[1]}_{\text{SECOND STEP}} + \underbrace{W[2]*X[2]}_{\text{THIRD STEP}} + \underbrace{W[3]*X[3]}_{\text{FOURTH STEP}}$$

$$Y[1] = W[0]*X[1] + W[1]*X[2] + W[2]*X[3] + W[3]*X[4]$$

$$Y[2] = W[0]*X[2] + W[1]*X[3] + W[2]*X[4] + W[3]*X[5]$$

$$Y[3] = W[0]*X[3] + W[1]*X[4] + W[2]*X[5] + W[3]*X[6]$$

$$\vdots \qquad \vdots \qquad \vdots \qquad \vdots \qquad \vdots$$

Fig. 12

| Register | Bits 63-48 | Bits 47-32 | Bits 31-16 | Bits 15-0 |
|---|---|---|---|---|
| R2 | $X_I[1]$ | $X_R[1]$ | $X_I[0]$ | $X_R[0]$ |
| R3 | $X_I[2]$ | $X_R[2]$ | $X_I[1]$ | $X_R[1]$ |
| R4 | $X_I[3]$ | $X_R[3]$ | $X_I[2]$ | $X_R[2]$ |
| R5 | $X_I[4]$ | $X_R[4]$ | $X_I[3]$ | $X_R[3]$ |
| R6 | $-W_I[0]$ | $W_R[0]$ | $-W_I[0]$ | $W_R[0]$ |
| R7 | $W_R[0]$ | $W_I[0]$ | $W_R[0]$ | $W_I[0]$ |
| R8 | $-W_I[1]$ | $W_R[1]$ | $-W_I[1]$ | $W_R[1]$ |
| R9 | $W_R[1]$ | $W_I[1]$ | $W_R[1]$ | $W_I[1]$ |
| R10 | $-W_I[2]$ | $W_R[2]$ | $-W_I[2]$ | $W_R[2]$ |
| R11 | $W_R[2]$ | $W_I[2]$ | $W_R[2]$ | $W_I[2]$ |
| R12 | $-W_I[3]$ | $W_R[3]$ | $-W_I[3]$ | $W_R[3]$ |
| R13 | $W_R[3]$ | $W_I[3]$ | $W_R[3]$ | $W_I[3]$ |
| | ←16 BITS→ | ←16 BITS→ | ←16 BITS→ | ←16 BITS→ |
| | ← 64 BITS → | | | |

Fig. 13

MICROPROCESSOR

BACKGROUND OF THE INVENTION

1. Field of the Invention

The present invention relates to a microprocessor including an arithmetic unit to perform a multiply-accumulate (MAC) operation on complex numbers, which is frequently used in performing a finite impulse response (FIR) filter operation on complex numbers, for example.

2. Description of Related Art

A general expression for an input and output relation of an FIR filter in terms of time is given by the following equation (1).

$$Y[n] = \sum_{k=0}^{m-1} W[k] \cdot X[n-k] \tag{1}$$

In the equation (1), m represents the number of taps of the FIR filter, and W[k] represents a filter coefficient associated with a k-th tap. Further, X[n−k] represents an input complex data sequence, and Y[n] represents an output of the FIR filter. Such an FIR filter operation is a so-called "convolution operation" which is executed by repeating an MAC operation.

There have been various proposals for causing a microprocessor to effectively perform the FIR filter operation. For example, the application note on "AltiVec Complex FIR" (URL: http://www.freescale.com/webapp/sps/site/overview.jsp?code=DR_PPCALTVCCFIR) of Freescale Semiconductor, Inc. discloses an example of a program for causing a processor employing a single instruction multiple data (SIMD) architecture capable of collectively processing 128-bit data to perform the FIR filter operation on complex numbers.

The processor disclosed in "AltiVec Complex FIR" employs the SIMD architecture. Specifically, the processor disclosed in "AltiVec Complex FIR" includes a plurality of similar MAC units for receiving a plurality data items (vector data) in response to a single instruction to perform MAC operations on the plurality of data items in parallel and output a plurality of MAC operation result data items.

Hereinafter, a description is made of an example for executing the FIR filter operation assuming that the tap number m is 4 in line with the concept disclosed in "AltiVec Complex FIR". Note that "AltiVec Complex FIR" discloses a microprocessor capable of processing 128-bit vector data containing eight 16-bit data items to be processed in parallel. To facilitate the explanation, a microprocessor dealing with 64-bit vector data containing four 16-bit data items to be processed in parallel will be described below. To facilitate the explanation, the convolution operation equation (1) is transformed into the following equation (2).

$$Y[n] = \sum_{k=0}^{3} W[k] \cdot X[n+k] \tag{2}$$

The output data Y[n] obtained by the equation (2) is represented by a total sum of four complex products. FIG. 12 shows data items Y[0] to Y[3]. When two data items are processed in parallel, the processor disclosed in "AltiVec Complex FIR" calculates Y[n] to Y[n+1] in parallel by using a single accumulator so as to enhance the effect of the parallel processing using the SIMD architecture. When four data items are processed in parallel, the processor disclosed in "AltiVec Complex FIR" calculates Y[n] to Y[n+3] in parallel with two accumulator registers.

For example, as shown in FIG. 12, in the case of calculating Y[0] and Y[1] in parallel, in a first step, a real part and an imaginary part of each of two complex products W[0]*X[0] and W[0]*X[1] are calculated, and the result is stored in an accumulator. In a second step, a real part and an imaginary part of each of two complex products W[1]*X[1] and W[1]*X[2] are calculated, and the result is added. Then, third and fourth steps are executed in a similar manner, with the result that the accumulator obtains a real part and an imaginary part of each of the data items Y[0] and Y[1]. FIG. 13 shows vector data groups used in the case of performing the calculations of the first to fourth steps shown in FIG. 12. Note that the register length of each of the registers R2 to R13 is 64 bits. Among a plurality of registers shown in FIG. 13, the registers R2 to R5 store real parts and imaginary parts of input data items X[0] to X[4]. For example, the register R2 stores a real part $X_R[0]$ and an imaginary part $X_I[0]$ of a data item X[0] as well as a real part $X_R[1]$ and an imaginary part $X_I[1]$ of a data item X[1]. The data length of each of $X_R[0]$, $X_I[0]$, $X_R[1]$, and $X_I[1]$ is 16 bits. The registers R6 to R13 hold filter coefficients W[1] to W[3].

FIGS. 14A and 14B each show a specific example of an arithmetic unit of the SIMD architecture. FIGS. 14A and 14B each show the configuration in which a first MAC circuit is disposed in parallel with a second MAC circuit. The first MAC circuit includes multipliers 9320 and 9321 and adders 9330 and 9340. The second MAC circuit includes multipliers 9322 and 9323 and adders 9331 and 9341. Note that the configuration of the arithmetic unit shown in FIGS. 14A and 14B is devised by the inventors of the present invention during the course of study on the improvement of the conventional microprocessor based on the description of "AltiVec Complex FIR". Accordingly, the configuration of the arithmetic unit is neither known nor disclosed in "AltiVec Complex FIR".

FIG. 14A shows a procedure for performing calculation for obtaining the real part of each of two complex products W[0]*X[0] and W[0]*X[1] among the calculations of the first step shown in FIG. 12 in response to a single instruction to instruct execution of the MAC operation. The real part of W[0]*X[0] is stored in lower-order 32 bits of the register R0 used as an accumulator. The real part of W[0]*X[1] is stored in higher-order 32 bits of the register R0.

On the other hand, FIG. 14B shows a procedure for performing calculation for obtaining the imaginary part of each of two complex products W[0]*X[0] and W[0]*X[1] among the calculations of the first step shown in FIG. 12 in response to a single instruction to instruct execution of the MAC operation. The imaginary part of W[0]*X[0] is stored in lower-order 32 bits of the register R1 used as an accumulator, and the imaginary part of W[0]*X[1] is stored in higher-order 32 bits of the register R1.

Note that, as shown in FIGS. 14A and 14B, when the register length of the accumulator storing the multiplication result is identical with the data length of the multiplication result, it is necessary to properly scale the accumulated value to be stored in the accumulator so as to avoid an overflow. The execution of such scaling causes a reduction in calculation accuracy. There is known a technique in which the register length of the accumulator storing the result of the MAC operation is set to be greater than the data length of the multiplication result to be cumulatively added (See Japanese Unexamined Patent Application Publication No. 10-134032

(Kubotaet al.) and U.S. Pat. No. 7,120,783 (Fotland et al.)). For example, when the multiplication result is 32-bit data, the accumulator to perform the MAC operation for cumulatively adding the data has a register length of 48 or 64 bits.

The inventors of the present invention have found the following fact. That is, when the technique for increasing the register length of the accumulator storing the MAC operation result so as to avoid the reduction in calculation accuracy due to the scaling, is applied to the technique for speeding up the FIR filter operation on complex numbers by using the SIMD architecture as illustrated in FIGS. 12, 13, 14A, and 14B, there arises a problem in that the number of registers to be allocated to accumulators for the MAC operation increases. For example, in the configuration shown in FIG. 14A, it is impossible for the register R0 of 64-bit length to hold two MAC operation results each having a length greater than 32 bits, and thus it is necessary to allocate another register to an accumulator for the MAC operation. In general, the number of operands of each instruction is limited, and the number of registers that can be specified by the operands of each instruction is usually limited. Accordingly, depending on instruction sets to be used, it is difficult to increase the number of accumulators for the MAC operation in some cases.

SUMMARY

A microprocessor according to a first aspect of the present invention includes an execution control section, a first register, a second register, a third register, and a complex multiply-accumulate operation (hereinafter, also abbreviated as "complex-MAC") unit. The execution control section fetches instructions containing a complex-MAC instruction to instruct an MAC operation on complex numbers and controls execution of the instructions.

The first register has a register length of at least $2^{m+1}$ bits and is capable of storing first complex data and second complex data each having a length of $2^m$ bits and each having a $2^{m-1}$-bit real part and a $2^{m-1}$-bit imaginary part. The second register has a register length of at least $2^{m+1}$ bits and is capable of storing third complex data and fourth complex data each having a length of $2^m$ bits and each having a $2^{m-1}$-bit real part and a $2^{m-1}$-bit imaginary part. The third register has a register length of at least $2^m+2$ bits.

The complex-MAC unit receives the first to fourth complex data from the first and second registers so as to perform the complex operation based on the control of the execution control section having fetched the complex-MAC instruction, and overwrites the third register with a value obtained by adding a value obtained through the complex operation to a stored value of the third register. Note that the value obtained through the complex operation is the sum of the real parts or imaginary parts of the product of the first and third complex data and the product of the second and fourth complex data.

In the microprocessor according to the first aspect of the present invention, the complex-MAC unit generates a single operation result by adding real parts or imaginary parts of two complex multiplication results. In this case, the maximum data length of each of the real part and the imaginary part of the two complex multiplication results is $2^m+1$ bits. Accordingly, the maximum data length of a single operation result obtained by adding the real parts or imaginary parts of the two complex multiplication results is $2^m+2$ bits. The microprocessor according to the first aspect of the present invention adds the operation result to the stored value of the third register having a register length of at least $2^m+2$ bits.

Thus, the complex-MAC unit generates a single operation result using vector data (first and second complex data) held in the first register and vector data (third and fourth complex data) held in the second register, and adds the obtained operation result to the third register having a register length (at least $2^m+2$ bits) that is greater than the data length ($2^m+1$ bits) of the real part or the imaginary part of the complex product. In other words, in the microprocessor according to the first aspect of the present invention, the third register is used as an accumulator for the MAC operation, whereby the reduction in calculation accuracy associated with the scaling can be suppressed without using a large number of additional registers.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7 is a table showing states of control signals used when the complex-MAC operation is performed by the microprocessor according to the first embodiment of the present invention;

FIG. 11 is a table showing states of control signals used when the complex-MAC operation is performed by the microprocessor according to the second embodiment of the present invention;

FIG. 12 is a diagram for explaining a procedure for performing a complex-MAC operation by a microprocessor according to a related art;

FIG. 13 is a diagram showing vector data used when the microprocessor according to the related art is caused to perform the complex-MAC operation.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Hereinafter, specific embodiments to which the present invention is applied will be described in detail with reference to the drawings. The same components are denoted by the same reference symbols throughout the drawings, and a redundant description thereof is omitted as appropriate for clarification of the explanation.

[First Embodiment]

Figure 1:
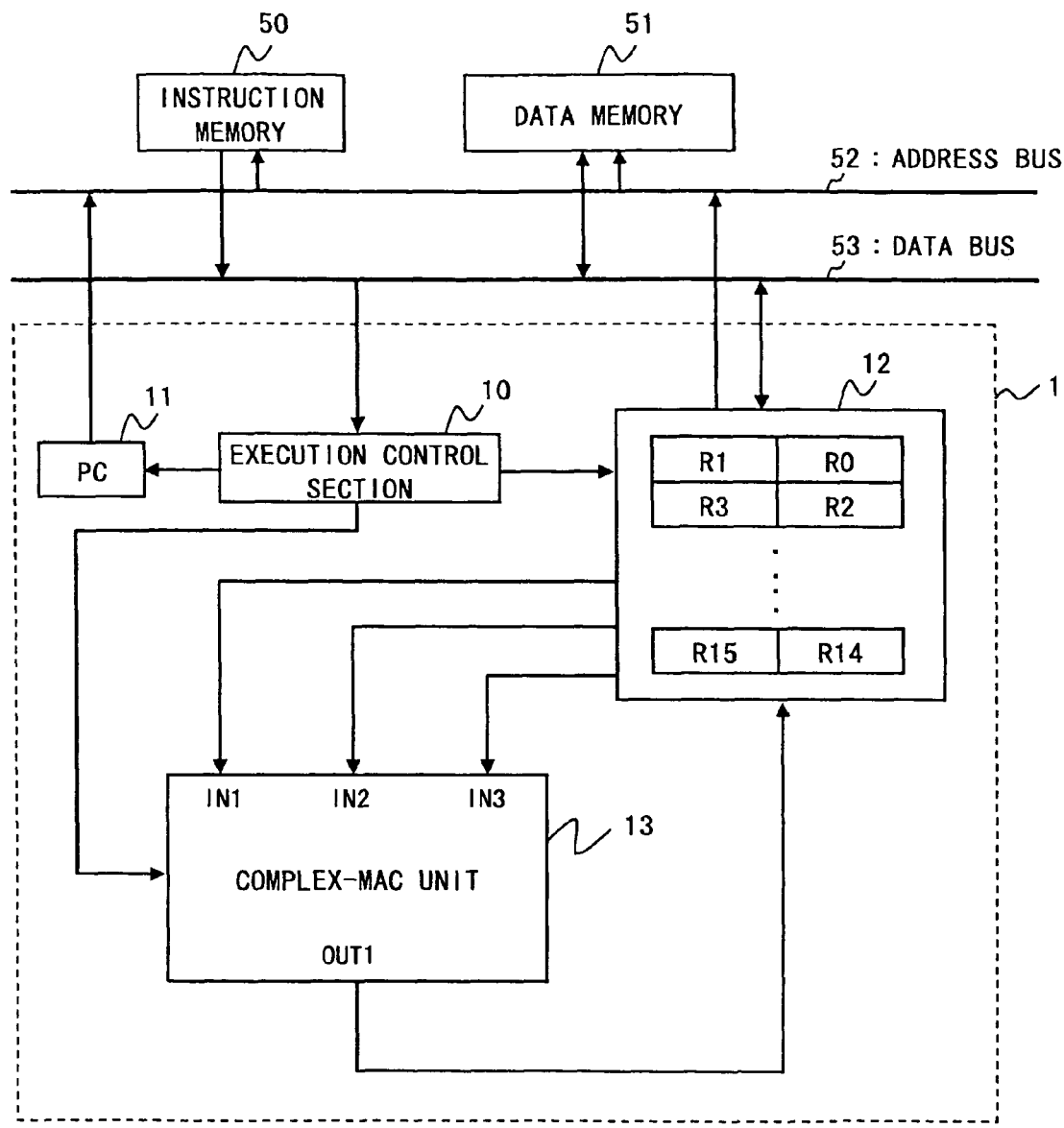
FIG. 1 is a block diagram showing a microprocessor according to a first embodiment of the present invention.

FIG. 1 shows a microprocessor 1 according to a first embodiment of the present invention. The microprocessor 1 is connected to an instruction memory 50 and a data memory 51 via an address bus 52 and a data bus 53. The instruction memory 50 stores a sequence of instructions to be performed by the microprocessor 1. The data memory 51 stores data to be input to the microprocessor 1 and data processed by the microprocessor 1. Note that FIG. 1 shows the instruction memory 50 and the data memory 51 which are logical structural units, and the memories are each constituted by a read only memory (ROM), a random access memory (RAM), or a flash memory, or a combination thereof.

An execution control section 10 fetches an instruction from the instruction memory 50 and decodes the fetched instruction. More specifically, the execution control section 10 determines an instruction type of the fetched instruction to obtain an instruction operand, and outputs data or a control signal, or a combination thereof to a program counter (PC) 11, a register file 12, and a complex-MAC unit 13 in accordance with information obtained by decoding the instruction.

The program counter 11 is a register to hold an address of the instruction to be fetched by the execution control section 10. A value of the program counter 11 is updated by the execution control section 10.

The register file 12 is a set of a plurality of general-purpose registers. In the first embodiment, a description is made assuming that the register file 12 includes 16 general-purpose registers R0 to R15 as shown in FIG. 1. Further, it is assumed that each of the general-purpose registers R0 to R15 is a 64-bit register. Note that the number and the register length of the general-purpose registers R0 to R15 are only examples and are not limited thereto. The general-purpose registers R0 to R15 can be used to enable various functions such as an accumulator to store input data and output data of the complex-MAC unit 13, or an address register to specify an address at the time of accessing a memory.

Figure 2:
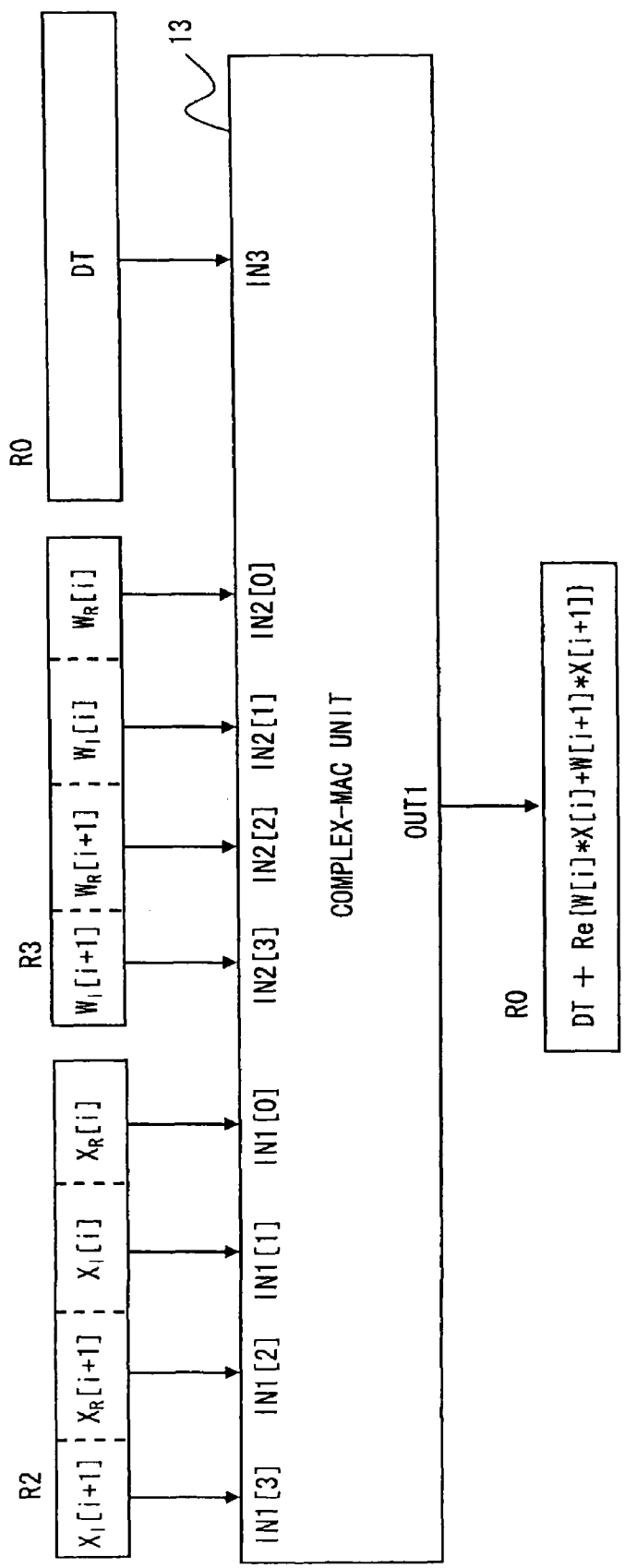
FIG. 2 is a conceptual diagram showing input/output data of a complex-MAC unit included in the microprocessor according to the first embodiment of the present invention.

The complex-MAC unit 13 performs a complex-MAC operation according to the control of the execution control section 10 having decoded a complex-MAC instruction. FIG. 2 shows an example of arithmetic processing performed by the complex-MAC unit 13 when a single complex-MAC instruction is decoded. In FIG. 2, each of $X_R[i]$, $X_I[i]$, $X_R[i+1]$, $X_I[i+1]$, $W_R[i]$, $W_I[i]$, $W_R[i+1]$, and $W_I[i+1]$ has a 16-bit length. Further, $X_R[i]$ and $X_I[i]$ represent a real part and an imaginary part of a complex number X[i], respectively, and $W_R[i]$ and $W_I[i]$ represent a real part and an imaginary part of a complex number W[i], respectively.

In the example shown in FIG. 2, the complex-MAC unit 13 receives two complex data items X[i] and X[i+1], which are held in the register R2 of 64-bit length, and two complex data items W[i] and W[i+1], which are held in the register R0 of 64-bit length, and calculates the real parts of W[i]*X[i]+W[i+1]*X[i+1]. Then, the complex-MAC unit 13 adds the obtained operation result of 32-bit to 34-bit length, to a value DT held in the register R0 of a 64-bit length, and overwrites the register R0 with the result obtained by adding the operation result to the value DT. Though not shown in FIG. 2, it is also possible for the complex-MAC unit 13 to calculate the imaginary part of W[i]*X[i]+W[i+1]*X[i+1] and add the operation result to the register R0.

Figure 3:
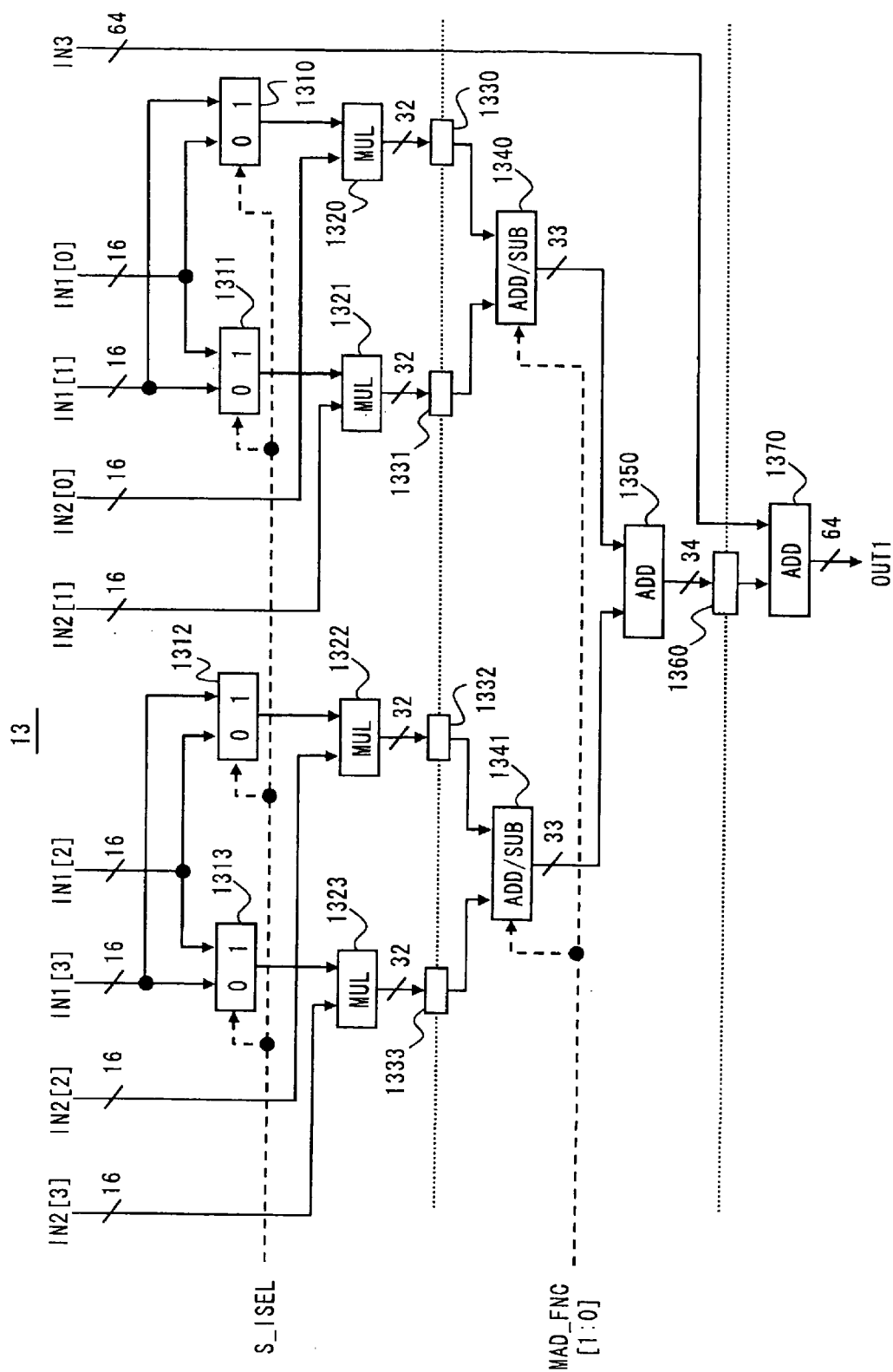
FIG. 3 is a diagram showing a configuration example of the complex-MAC unit included in the microprocessor according to the first embodiment of the present invention.

Next, a description is given of a specific configuration example of the complex-MAC unit 13 shown in FIGS. 1 and 2. FIG. 3 is a block diagram showing a configuration example of the complex-MAC unit 13. In the configuration example shown in FIG. 3, a three-stage pipeline architecture is employed. Note that the configuration of the complex-MAC unit 13 shown in FIG. 3 is only an example, and those skilled in the art can modify the present invention in various manners with reference to FIG. 3 and based on the following descriptions and common general technical knowledge.

In FIG. 3, IN1[0] to IN1[3] are 64-bit data supplied from the register file 12 to an IN1 terminal of the complex-MAC unit 13, and each of IN1[0] to IN1[3] is a 16-bit data item. Likewise, IN2[0] to IN2[3] are 64-bit data supplied from the register file 12 to an IN2 terminal of the complex-MAC unit 13, and each of IN2[0] to IN2[3] is a 16-bit data item.

A selector 1310 receives IN1[0] and IN1[1] that are supplied to the IN1 terminal. Then, the selector 1310 selects and outputs IN1[0] when a 1-bit logical signal S_ISEL supplied from the execution control section 10 is "0", and selects and outputs IN1[1] when the signal S_ISEL is "1".

A selector 1311 receives IN1[0] and IN1[1] that are supplied to an IN1 terminal of the selector 1310. Then, the selector 1311 selects and outputs IN1[1] when the 1-bit logical signal S_ISEL supplied from the execution control section 10 is "0", and selects and outputs IN1[0] when the signal S_ISEL is "1". That is, the selectors 1311 and 1312 operate complementarily, and when one of the selectors 1311 and 1312 selects IN1[0], the other of the selectors 1311 and 1312 selects IN1[1].

A multiplier 1320 multiplies 16-bit data IN2[0] supplied to the IN2 terminal by output data of the selector 1310, and outputs a multiplication result of 32-bit length. A multiplier 1321 multiplies 16-bit data IN2[1] supplied to the IN2 terminal by output data of the selector 1311, and outputs a multiplication result of 32-bit length. The outputs of the multipliers 1320 and 1321 are held in pipeline latches 1330 and 1331, respectively.

Figures 4A, 4B, 5:
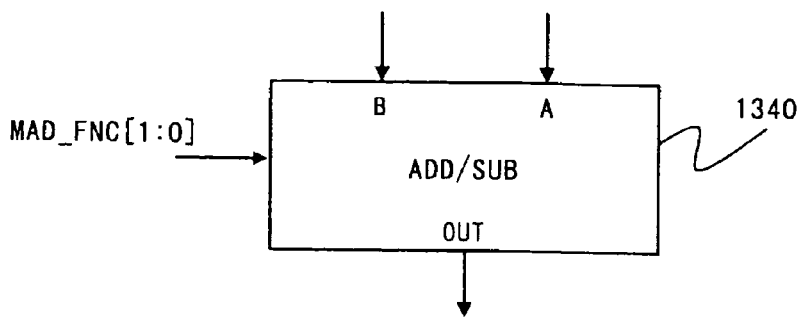
FIG. 4A is a diagram showing operation logic of an adder/subtractor included in the complex-MAC unit according to the first embodiment of the present invention.
FIG. 4B is an operation logic table showing the operation logic of the adder/subtractor shown in FIG. 4A.
FIG. 5 is a diagram for explaining a procedure for performing a complex-MAC operation.

Next, in a second pipeline stage, an adder/subtractor 1340 receives two multiplication results held in the pipeline latches 1330 and 1331, and performs addition or subtraction on the results. The adder/subtractor 1340 outputs data of 33-bit length. The operation contents of the adder/subtractor 1340 are controlled by a 2-bit control signal MAD_FNC[1:0] supplied from the execution control section 10. FIGS. 4A and 4B each show operation logic of the adder/subtractor 1340. The adder/subtractor 1340 performs three sets of calculations, that is, A+B, A−B, and B−A in accordance with the table shown in FIG. 4B.

Meanwhile, selectors 1312 and 1313, multipliers 1322 and 1323, pipeline latches 1332 and 1333, and an adder/subtractor 1341 perform operations on four 16-bit data items IN1[2], IN1[3], IN2[2], and IN2[3] in the same manner as the selectors 1310 and 1311, the multipliers 1320 and 1321, the pipeline latches 1330 and 1331, and the adder/subtractor 1340.

An adder 1350 adds two outputs of the adder/subtractors 1340 and 1341 to each other. The adder 1350 outputs data of 34-bit length. The output of the adder 1350 is held in a pipeline latch 1360.

Finally, in a third pipeline stage, an adder 1370 outputs 64-bit data obtained by adding the operation result of 34-bit length held in the pipeline latch 1360, to 64-bit data supplied to an IN3 terminal. In the case of causing the complex-MAC unit 13 to perform the MAC operation, a data source register for supplying data to the IN3 terminal may be identical to an output destination register for outputting data to an OUT1 terminal, or the registers may be implemented as separate registers.

In the configuration example shown in FIG. 3, the selectors 1310 and 1311, the multipliers 1320 and 1321, the pipeline latches 1330 and 1331, and the adder/subtractor 1340 enable obtainment of the real part or the imaginary part of a multiplication result of first complex data (for example, $X_R[i]$ and $X_I[i]$) supplied to IN1[0] and IN1[1], and third complex data (for example, $W_R[i]$ and $W_I[i]$) supplied to IN2[0] and IN2[1].

Similarly, the selectors 1312 and 1313, the multipliers 1322 and 1323, the pipeline latches 1332 and 1333, and the adder/subtractor 1341 enable obtainment of the real part or the imaginary part of a multiplication result of second complex data (for example, $X_R[i+1]$ and $X_I[i+1]$) supplied to IN1[2] and IN1[3], and fourth complex data (for example, $W_R[i+1]$ and $W_I[i+1]$) supplied to IN2[2] and IN2[3].

Accordingly, in the configuration example shown in FIG. 3, the adder 1350 outputs the result of adding the real parts or imaginary parts of two complex multiplication results. In other words, the complex-MAC unit 13 receives four complex data items in total, and performs two complex multiplications in parallel, thereby obtaining two real parts (or imaginary parts) of the complex multiplication results. Furthermore, the complex-MAC unit 13 adds those two values (real parts or imaginary parts of complex multiplication results) by using the adder 1350, and then adds the addition result to the previously accumulated value by using the adder 1370.

Hereinafter, a description is given of a procedure for causing the microprocessor 1 to perform the FIR filter operation shown in FIG. 12 assuming that the tap number m is 4. As described above, the example shown in FIG. 12 is characterized by utilizing parallel processing performance of the microprocessor employing the SIMD architecture to calculate two complex multiplications (specifically, W[0]*X[0] and W[0]*X[1]) associated with two output data items Y[0] and Y[1] in parallel. On the other hand, the example in which the microprocessor 1 performs the FIR filter operation as described later is characterized by performing two complex multiplications for obtaining a single output data item Y[0] and then adding two multiplication results to each other, thereby generating a single output data item. Specifically, as shown in FIG. 5, in the first step, the real part and the imaginary part of the sum of two complex products, that is, "W[0]*X[0]+W[1]*X[1]" are calculated, and the result is stored in an accumulator. In the subsequent second step, the real part and the imaginary part of the sum of two complex products, that is, "W[2]*X[2]+W[3]*X[3]" are calculated, and the result is added to the accumulator. Thus, the accumulator obtains the real part and the imaginary part of Y[0]. Similarly, by executing the third and fourth steps, the accumulator obtains the real part and the imaginary part of Y[1].

Note that the microprocessor 1 performs calculation of the first step shown in FIG. 5 in response to two complex multiplication instructions. One of the two complex multiplication instructions is an instruction (VCMADRE instruction) to calculate the real part of "W[0]*X[0]+W[1]*X[1]", and the other of the two complex multiplication instructions is an instruction (VCMADIM instruction) to calculate the imaginary part of "W[0]*X[0]+W[1]*X[1]".

Figure 6A:
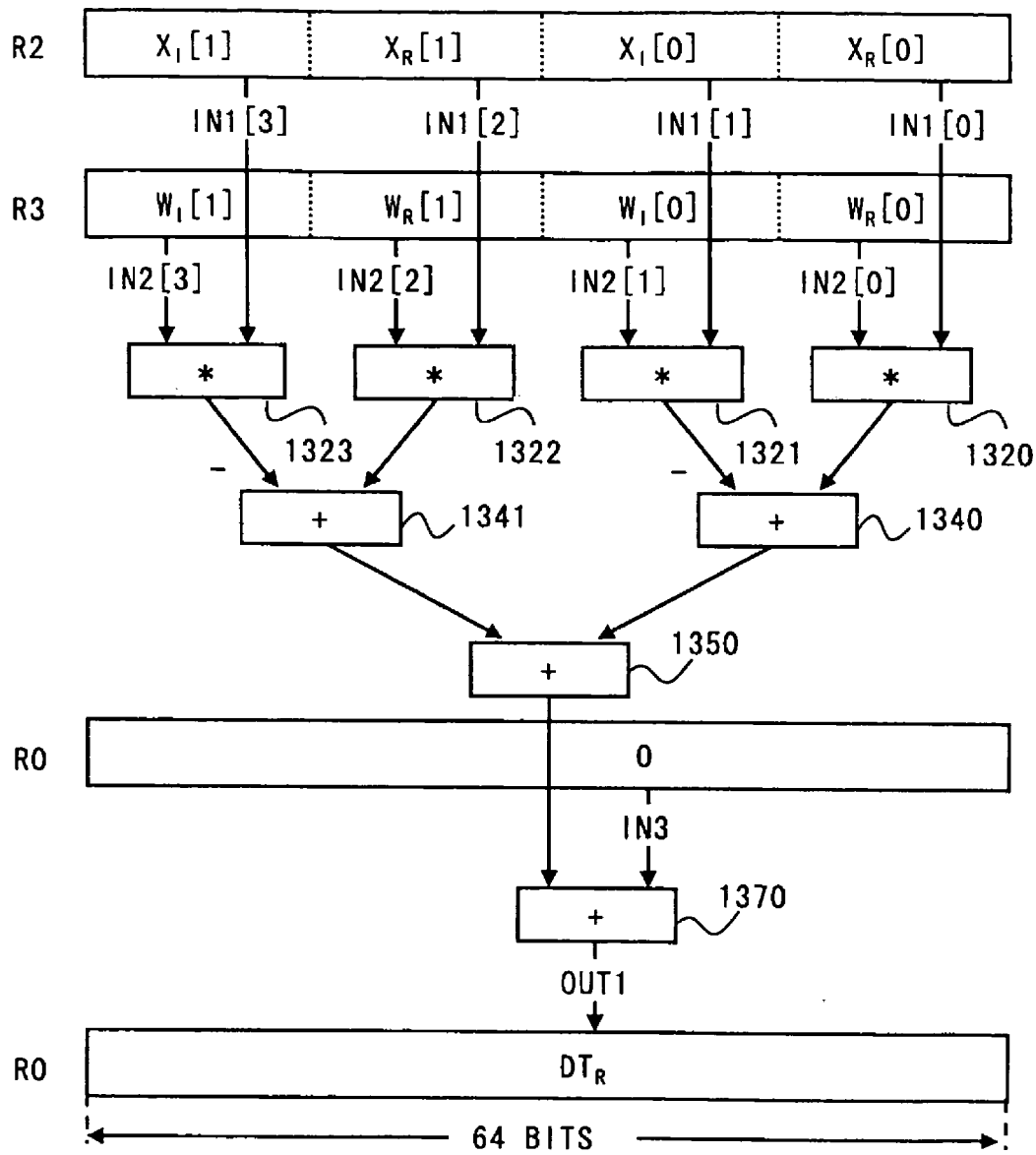
FIGS. 6A to 6D are conceptual diagrams for explaining a procedure for performing a complex-MAC operation by the microprocessor according to the first embodiment of the present invention.

FIG. 6A shows an operation of the complex-MAC unit 13 in response to the VCMADRE instruction to calculate the real part of the first step shown in FIG. 5. As shown in FIG. 6A, the VCMADRE instruction specifies three operands. The registers R2 and R3 specified as a first operand and a second operand, respectively, are registers storing the real part and the imaginary part of each of the complex data items X[0], X[1], W[0], and W[1] to be processed in the complex-MAC operation. Further, the register R0 specified as a third operand is a register used as an accumulator storing the results of the complex-MAC operation. Based on the control of the execution control section 10 having decoded the VCMADRE instruction, the multipliers 1320 and 1321 and the adder/subtractor 1340 calculate the real part of X[0]*W[0]. In parallel with the calculation, the multipliers 1322 and 1323 and the adder/subtractor 1341 calculate the real part of X[1]*W[1]. Furthermore, the adder 1350 adds the real part of X[0]*W[0] and the real part of X[1]*W[1] to each other. Finally, the adder 1370 adds the output of the adder 1350 to the stored value of the register R0. Thus, the real part of "W[0]*X[0]+W[1]*X[1]" is held in the register R0 as an accumulated value $DT_R$.

Figure 6B:
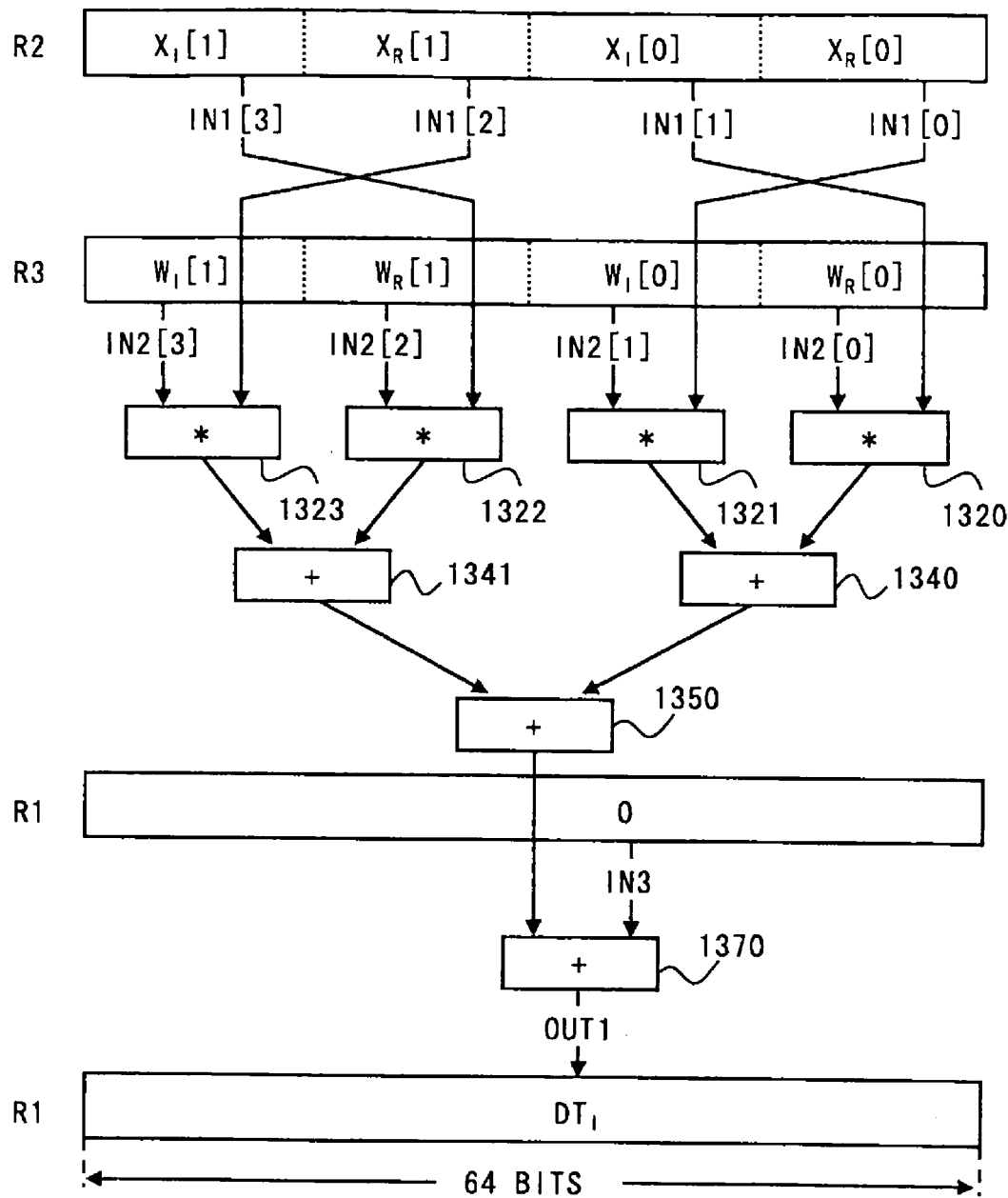

Meanwhile, FIG. 6B shows an operation of the complex-MAC unit 13 in response to the VCMADIM instruction to calculate the imaginary part of the first step shown in FIG. 5. The VCMADIM instruction also specifies three operands. These three operands function in the same manner as those of the VCMADRE instruction. Specifically, the registers R2 and R3 specified as the first operand and the second operand, respectively, are registers storing the real part and the imaginary part of each of the complex data items X[0], X[1], W[0], and W[1] to be processed in the complex-MAC operation. Further, the register R1 specified as the third operand is a register used as an accumulator storing the results of the complex-MAC operation. Based on the control of the execution control section 10 having decoded the VCMADIM instruction, the multipliers 1320 and 1321 and the adder/subtractor 1340 calculate the imaginary part of X[0]*W[0]. In parallel with the calculation, the multipliers 1322 and 1323 and the adder/subtractor 1341 calculate the imaginary part of X[1]*W[1]. Furthermore, the adder 1350 adds the imaginary part of X[0]*W[0] and the imaginary part of X[1]*W[1] to each other. Finally, the adder 1370 adds the output of the adder 1350 to the stored value of the register R1. Thus, the imaginary part of "W[0]*X[0]+W[1]*X[1]" is held in the register R1 as an accumulated value DTI.

Figure 6C:
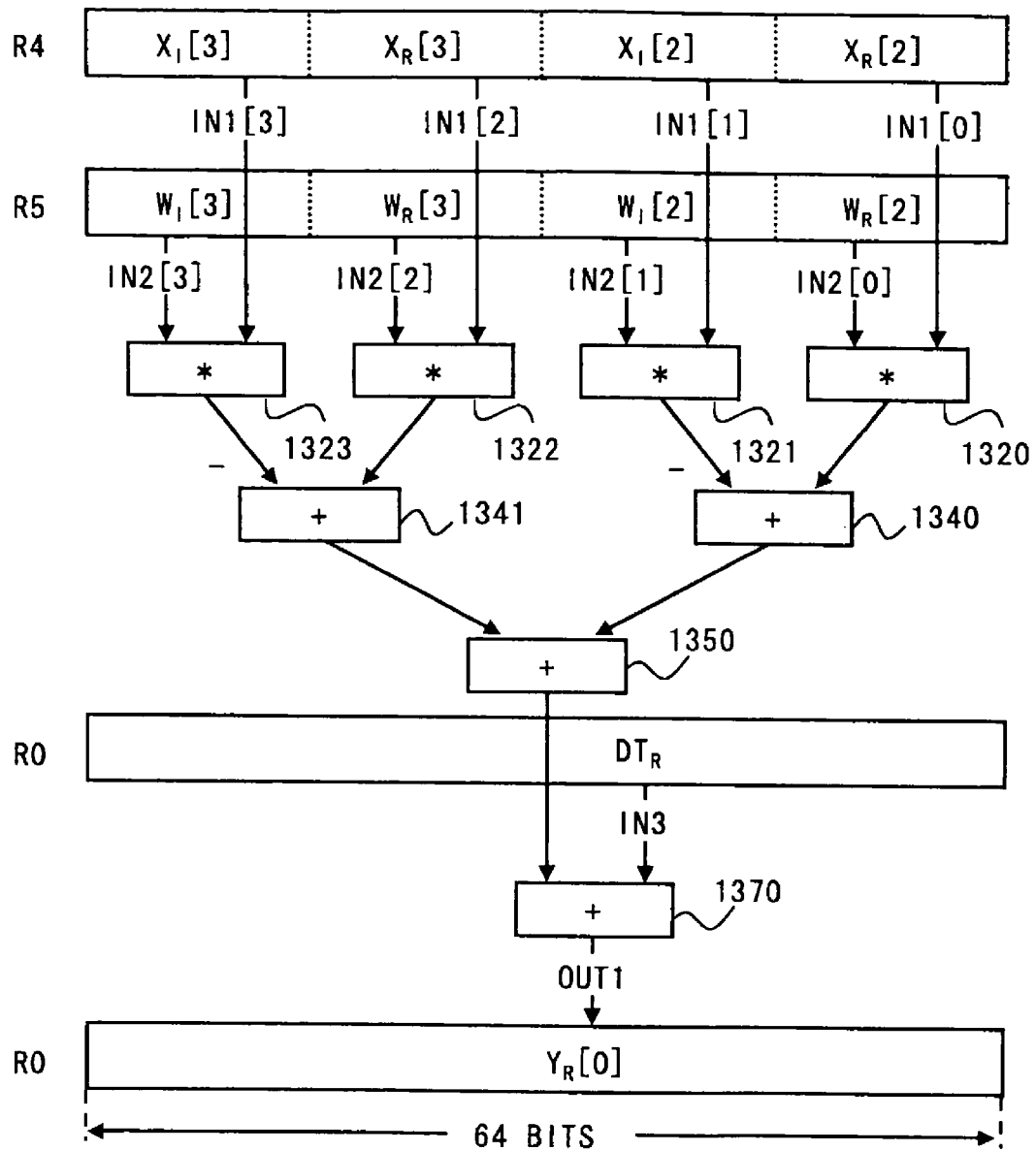
Figure 6D:
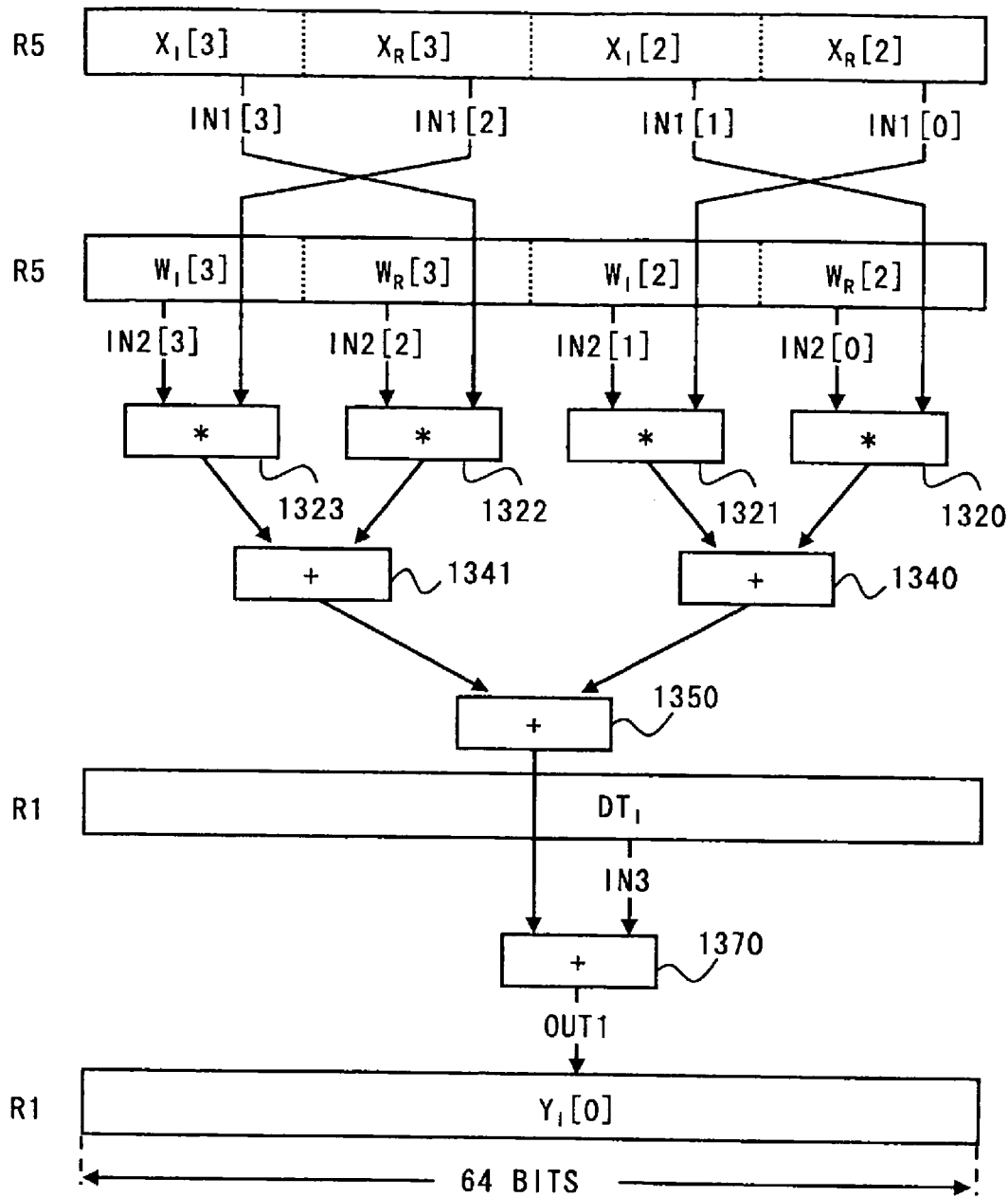

FIGS. 6C and 6D show processes for executing the VCMADRE instruction and the VCMADIM instruction, respectively, corresponding to the second step of FIG. 5 which is executed subsequent to the first step of FIG. 5. Based on the control of the execution control section 10 having decoded the VCMADRE instruction shown in FIG. 6C, the multipliers 1320 and 1321 and the adder/subtractor 1340 calculate the real part of X[2]*W[2]. In parallel with the calculation, the multipliers 1322 and 1323 and the adder/subtractor 1341 calculate the real part of X[3]*W[3]. Furthermore, the adder 1350 adds the real part of X[2]*W[2] and the real part of X[3]*W[3] to each other. Finally, the adder 1370 adds the output of the adder 1350 to the accumulated value $DT_R$ (specifically, real part of "W[0]*X[0]+W[1]*X[1]" previously held) of the register R0. Thus, the real part of the output data Y[0] is held in the register R0.

Based on the control of the execution control section 10 having decoded the VCMADIM instruction shown in FIG. 6D, the multipliers 1320 and 1321 and the adder/subtractor 1340 calculate the imaginary part of X[2]*W[2]. In parallel with the calculation, the multipliers 1322 and 1323 and the adder/subtractor 1341 calculate the imaginary part of X[3]*W[3]. Furthermore, the adder 1350 adds the imaginary part of X[2]*W[2] and the imaginary part of X[3]*W[3] to each other. Finally, the adder 1370 adds the output of the adder 1350 to the accumulated value $DT_I$ (specifically, imaginary part of "W[0]*X[0]+W[1]*X[1]" previously held) of the register R0. Thus, the imaginary part of the output data Y[0] is held in the register R1.

Note that, as described above, the operations of the selectors 1310 and 1311 and the adder/subtractors 1340 and 1341, which are included in the complex-MAC unit 13, are controlled by the control signals S_ISEL and MAD_FNC[1:0] supplied from the execution control section 10 to the complex-MAC unit 13. The table of FIG. 7 shows combinations of control signal groups that are supplied from the execution control section 10 to the complex-MAC unit 13 in response to the decoded VCMADRE instruction and VCMADIM instruction shown in FIG. 6A to 6D.

As described above, the microprocessor 1 according to the first embodiment includes the complex-MAC unit 13 suitable for the execution of the complex-MAC operation. Accordingly, the microprocessor 1 performs two complex multiplications (for example, W[0]*X[0] and W[1]*X[1]) in parallel so as to obtain a single output data item (for example, Y[0]) of the complex-MAC operation, and adds two multiplication results to each other, thereby making it possible to generate a single output data item.

The complex-MAC unit 13 receives four complex data items (for example, X[0], X[1], W[0], and W[1]) in total from two input registers (for example, registers R2 and R3) of 64-bit length, and performs two complex multiplications (for example, W[0]*X[0] and W[1]*X[1]) in parallel using the four complex data items, thereby obtaining two real parts (or imaginary parts) of the complex multiplication results. Further, the complex-MAC unit 13 adds a value (for example, real part of "W[0]*X[0]+W[1]*X[1]") obtained by adding the obtained two real parts (or imaginary parts) of the complex multiplication results to each other by using the adder 1350, to a stored value of an output register (for example, register R0) which is used as an accumulator and which has a 64-bit length.

Figure 14A:
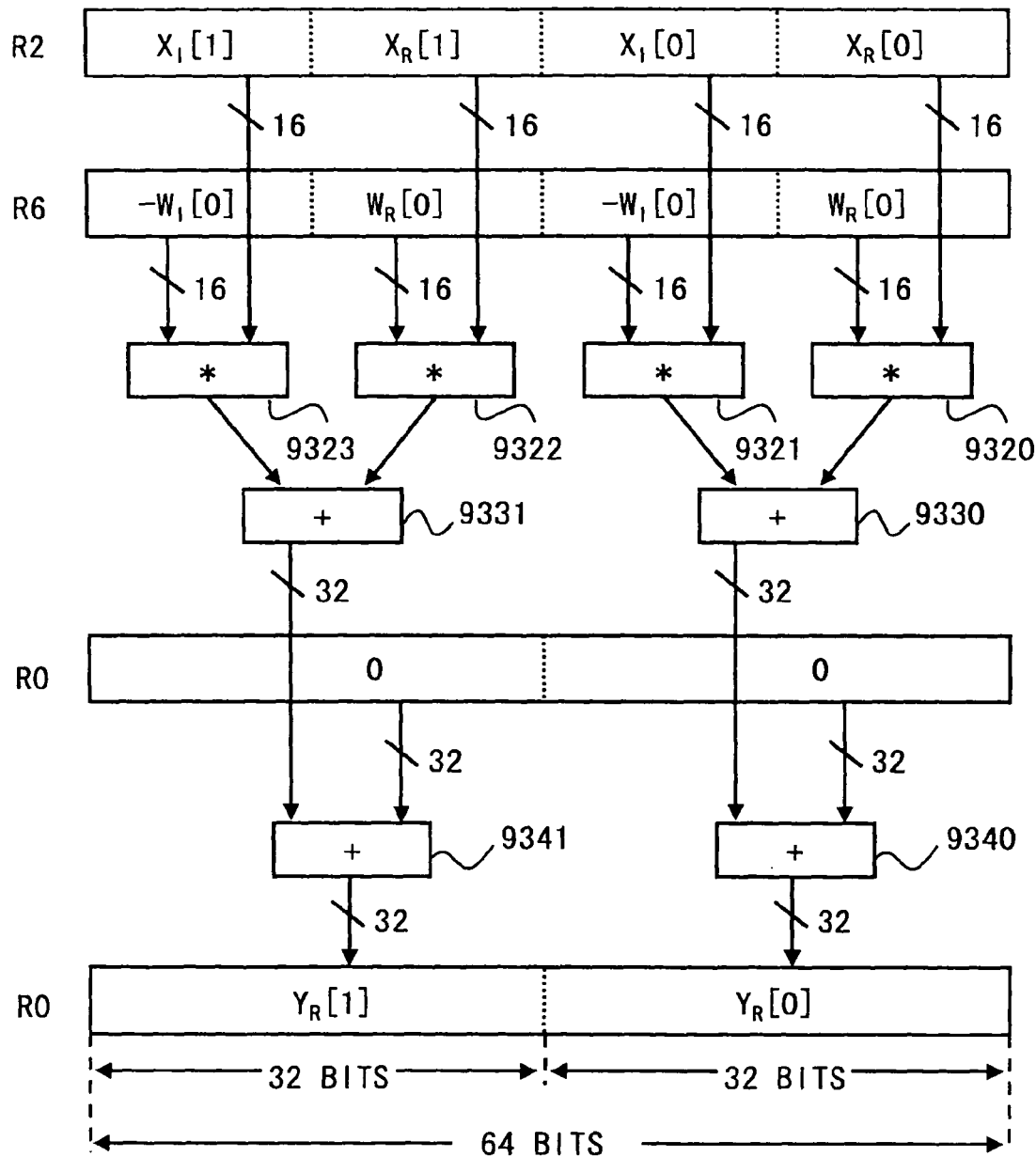
FIGS. 14A and 14B are conceptual diagrams for explaining a procedure for performing the complex-MAC operation by the microprocessor according to the related art.
Figure 14B:
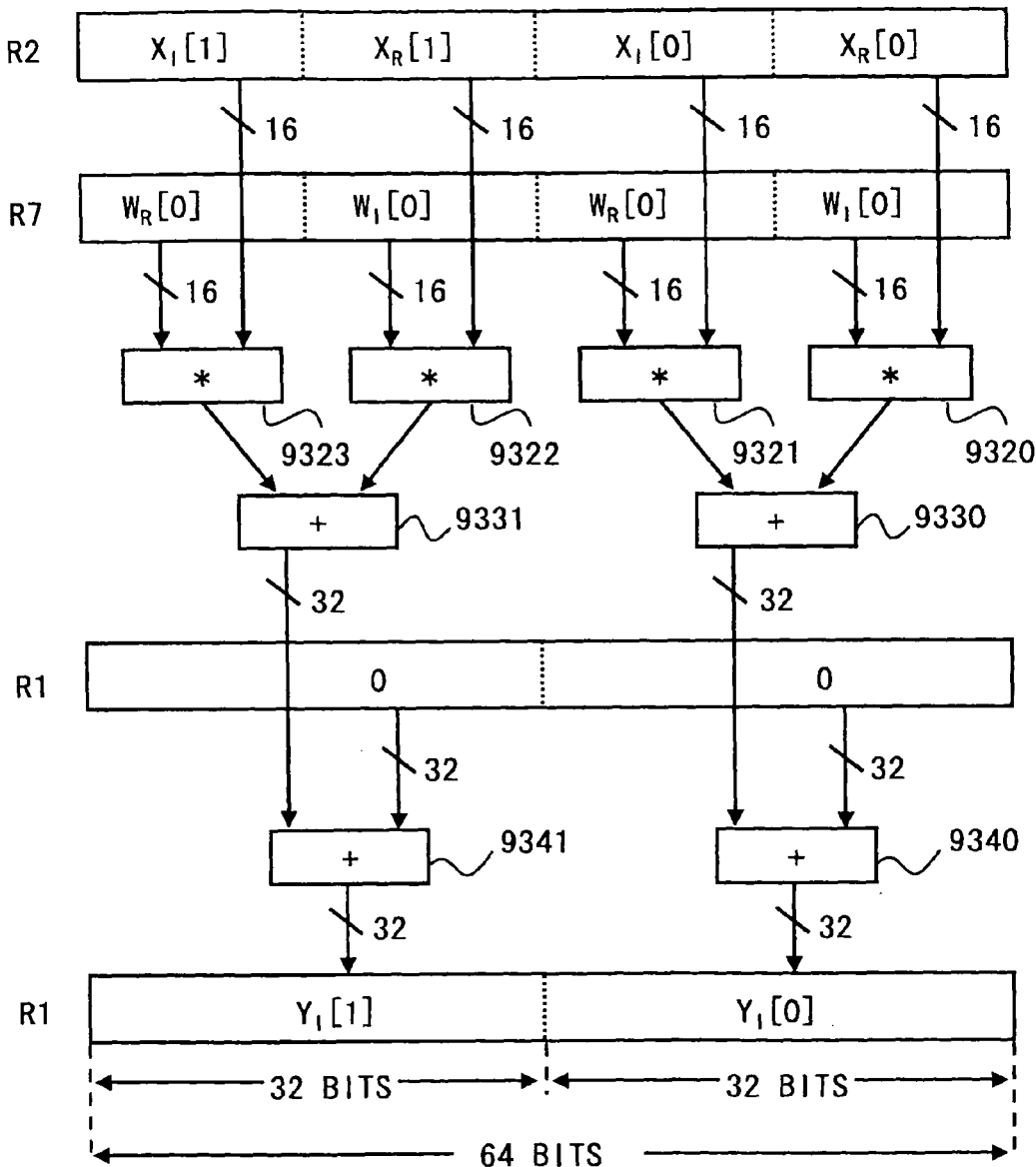

In this configuration, it is only necessary for the microprocessor 1 to hold a single output data item (for example, real part of "W[0]*X[0]+W[1]*X[1]") in a single output register (for example, register R0). In other words, the microprocessor 1 is different from the configuration examples shown in FIGS. 14A and 14B in which the real parts (or imaginary parts) of two complex multiplication results need to be held in the accumulator. Accordingly, the microprocessor 1 enables the use of the entire output register, which is used as an accumulator and which has a 64-bit length, so as to store the MAC operation results, whereby the reduction in calculation accuracy associated with the scaling can be suppressed without using additional registers.

[Second Embodiment]

Figure 8:
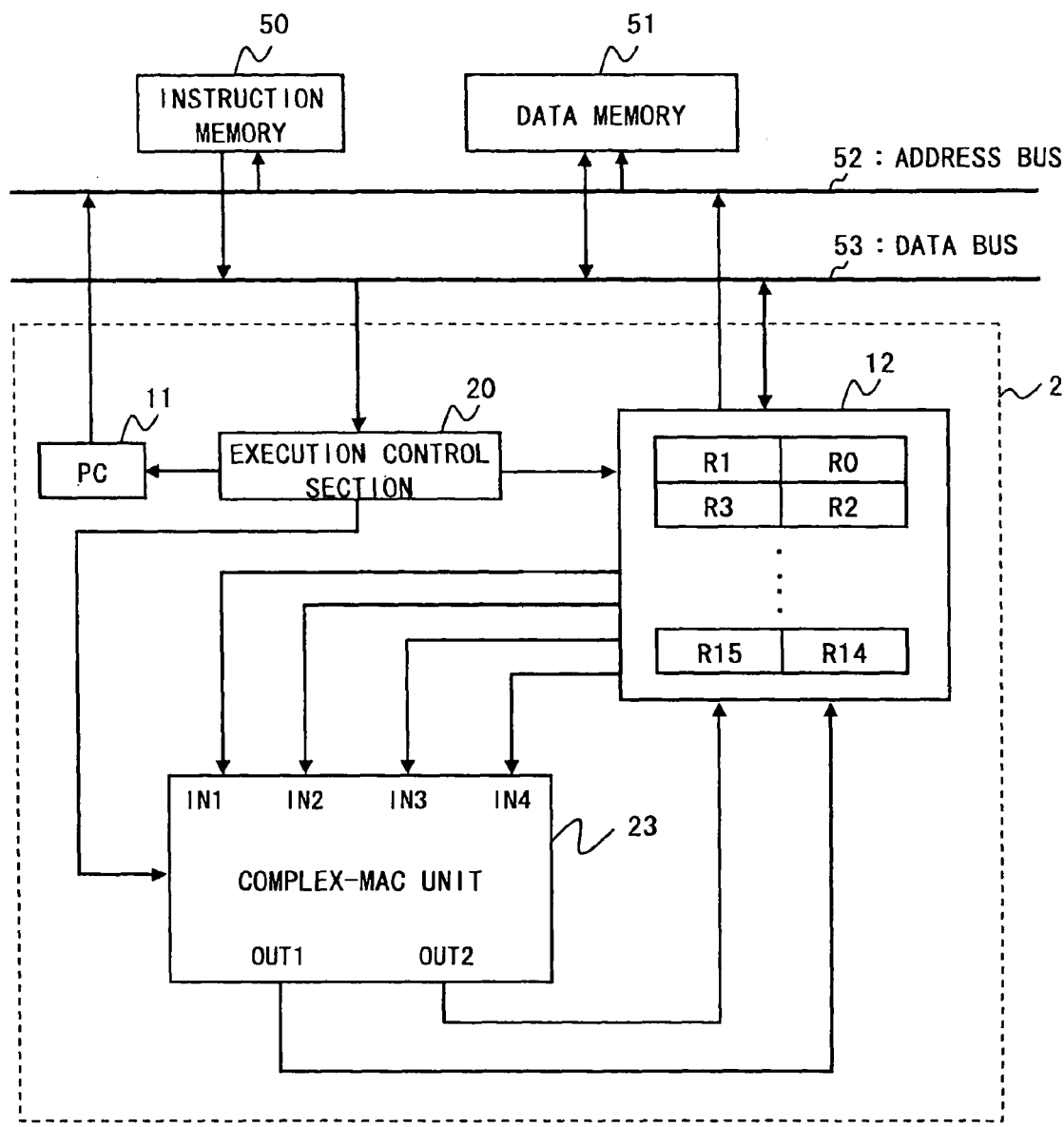
FIG. 8 is a block diagram showing a microprocessor according to a second embodiment of the present invention.

FIG. 8 shows a configuration of a microprocessor 2 according to a second embodiment of the present invention. The microprocessor 2 includes a complex-MAC unit 23 having a configuration different from that of the complex-MAC unit 13. The complex-MAC unit 13 described in the first embodiment of the present invention is configured to obtain the sum of the real parts of two complex products and the sum of the imaginary parts thereof (for example, real part and imaginary part of "W[0]*X[0]+W[1]*X[1]") in response to two instructions (for example, VCMADRE instruction and VCMADIM instruction). Meanwhile, the complex-MAC unit 23 is configured to obtain the sum of the real parts of two complex products and the sum of the imaginary parts thereof in response to a single instruction, by increasing hardware parallelism. The complex-MAC unit 23 is a 4-input/2-output arithmetic unit configured to receive four 64-bit data items from four registers contained in the register file 12, and output two 64-bit data items as the operation results to two registers contained in the register file 12. Further, operations of the complex-MAC unit 23 are controlled by an execution control section 20.

Figure 9:
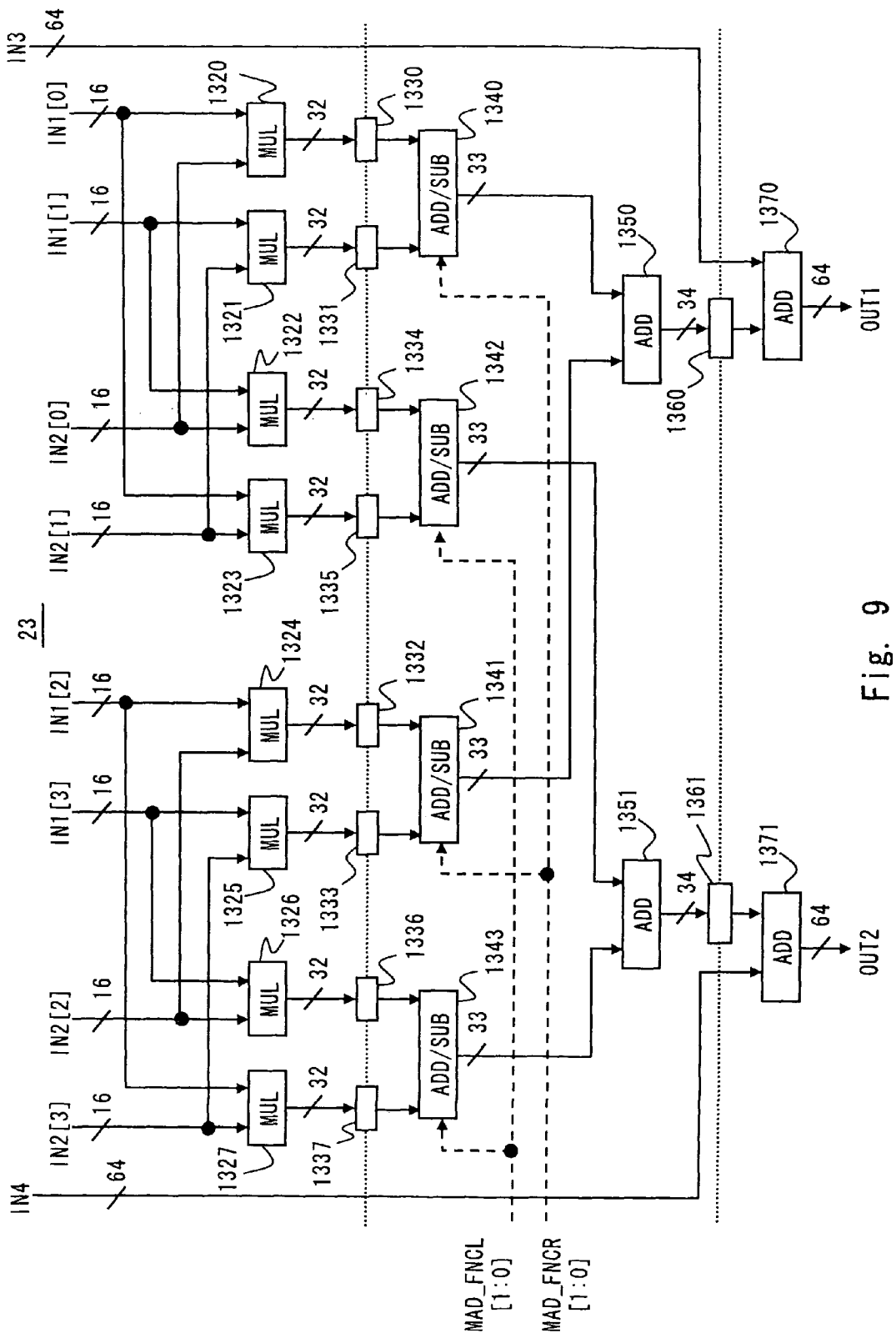
FIG. 9 is a diagram showing a configuration example of a complex-MAC unit included in the microprocessor according to the second embodiment of the present invention.

A configuration example of the complex-MAC unit 23 is shown in FIG. 9. Hereinafter, the configuration of FIG. 9 is described focusing on differences from the configuration of FIG. 3. In FIG. 9, the multipliers 1320 to 1323, the pipeline latches 1330 to 1333, the adder/subtractors 1340 and 1341, the adder 1350, the pipeline latch 1360, and the adder 1370 are identical with those shown in FIG. 3. For ease of explanation, those pieces of hardware are hereinafter referred to as a common hardware group. In the configuration of FIG. 9, in addition to the common hardware group, there is provided an additional hardware group having the same function as that of the common hardware group. Specifically, the additional hardware group includes multipliers 1324 to 1327, pipeline latches 1334 to 1337, adder/subtractors 1342 and 1343, an adder 1351, a pipeline latch 1361, and an adder 1371. In the configuration shown in FIG. 8, the common hardware group calculates the real part of the sum of two complex products (for example, "W[0]*X[0]+W[1]*x[1]"). In parallel with the calculation, the additional hardware group calculates the imaginary part of the sum of two complex products (for example, "W[0]*X[0]+W[1]*X[1]").

In other words, the complex-MAC unit 23 is configured such that "calculations for obtaining the real part and the imaginary part of the sum of two complex products", for example, calculations for obtaining the real part and the imaginary part of "W[0]*X[0]+W[1]*X[1]", which are performed in two steps by the complex-MAC unit 13, can be performed in parallel. Accordingly, in the configuration example shown in FIG. 9, there is no need to provide the selectors 1310 and 1311 to select the input data for the multipliers 1320 and 1321.

Hereinafter, a description is given of a procedure for causing the microprocessor 2 to execute the first step and the second step of the FIR filter operation shown in FIG. 5 assuming that the tap number m is 4. The microprocessor 2 performs calculation of the first step shown in FIG. 5 in response to a single complex multiplication instruction (VCMAD instruction). Specifically, the microprocessor 2 calculates the real part and the imaginary part of "W[0]*X[0]+W[2]*X[1]" in response to the VCMAD instruction.

Figure 10A:
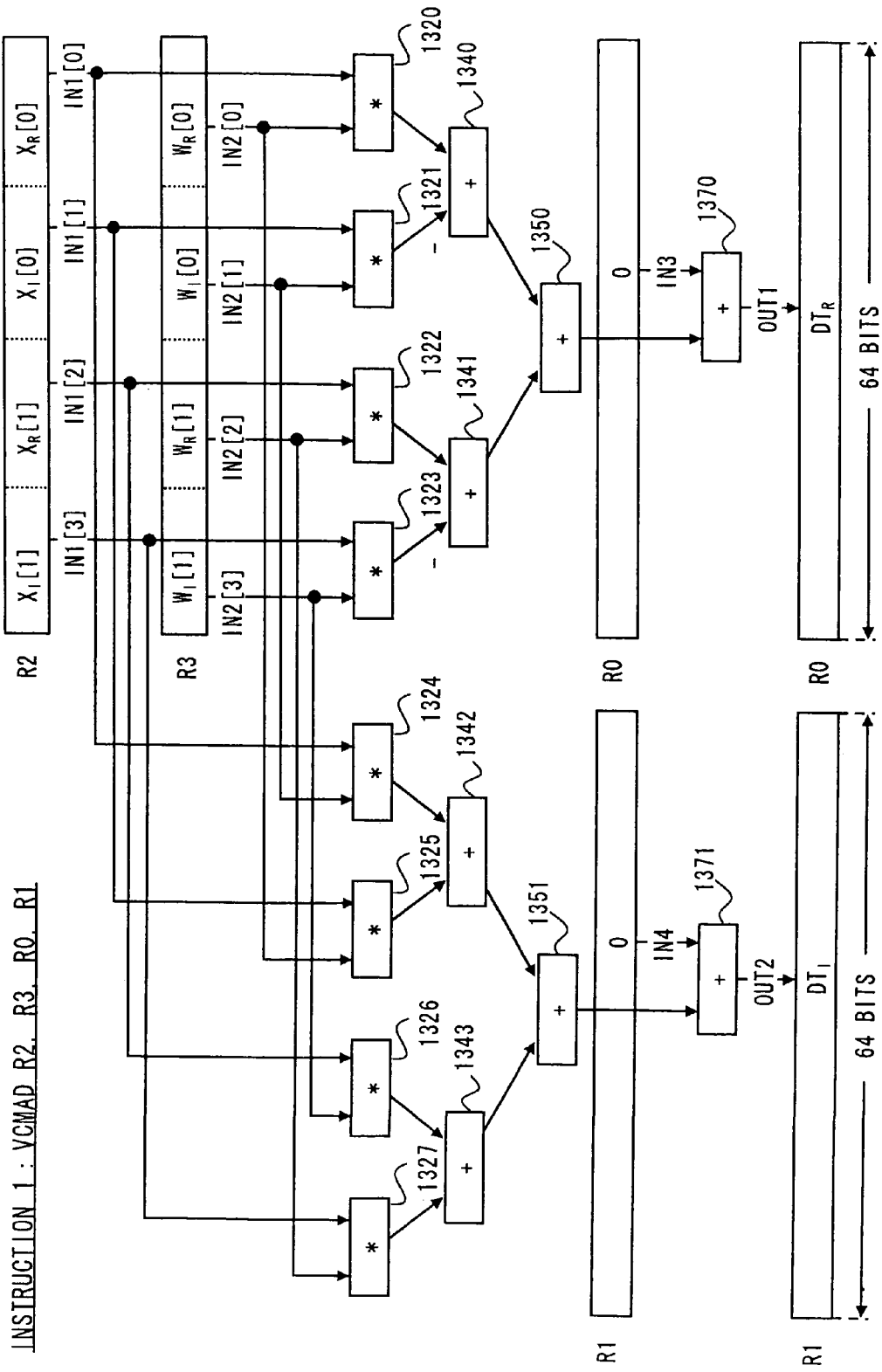
FIGS. 10A and 10B are conceptual diagrams for explaining a procedure for performing a complex-MAC operation by the microprocessor according to the second embodiment of the present invention.

FIG. 10A shows an operation of the complex-MAC unit 23 in response to the VCMAD instruction for calculating the first step shown in FIG. 5. As shown in FIG. 10A, the VCMAD instruction specifies four operands. The registers R2 and R3 specified as a first operand and a second operand, respectively, are resisters storing the real part and the imaginary part of the complex data items X[0], X[1], W[0], and W[1] to be processed in the complex-MAC operation. The registers R0 and R1 specified as a third operand and a fourth operand, respectively, are registers used as accumulators storing the results of the complex-MAC operation. Specifically, the calculation result of the real part of "W[0]*X[0]+W[1]*X[1]" is added to the register R0, and the calculation result of the imaginary part of "W[0]*X[0]+W[1]*X[1]" is added to the register R1.

FIG. 10A is described in more detail below. Based on the control of the execution control section 20 having decoded the VCMAD instruction, the multipliers 1320 and 1321 and the adder/subtractor 1340 calculate the real part of X[0]*W[0], and the multipliers 1322 and 1323 and the adder/subtractor 1341 calculate the real part of X[1]*W[1]. Further, the multipliers 1324 and 1325 and the adder/subtractor 1342 calculate the imaginary part of X[0]*W[0], and the multipliers 1326 and 1327 and the adder/subtractor 1343 calculate the imaginary part of X[1]*W[1]. Then, the adder 1350 adds the real part of X[0]*W[0] and the real part of X[1]*W[1] to each other, and the adder 1351 adds the imaginary part of X[0]*W[0] and the imaginary part of X[1]*W[1] to each other. Finally, the adder 1370 adds the output of the adder 1350 to the stored value of the register R0, and the adder 1371 adds the output of the adder 1351 to the stored value of the register R1. Thus, the real part of "W[0]*X[0]+W[1]*X[1]" is held in the register R0 as the accumulated value $DT_R$, and the imaginary part of "W[0]*X[0]+W[1]*X[1]" is held in the register R1 as the accumulated value DTI.

Figure 10B:
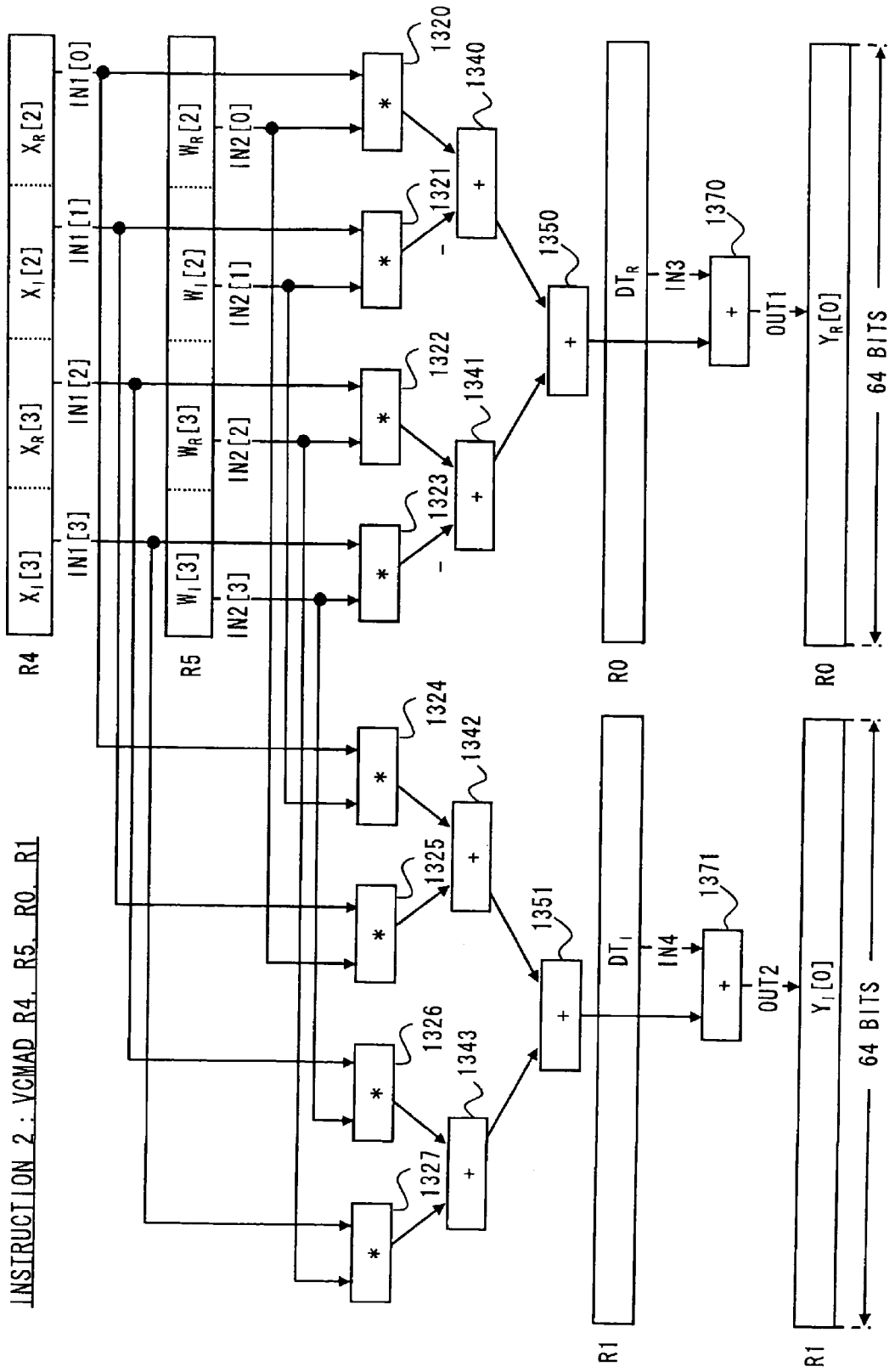

FIG. 10B shows a procedure for executing the VCMAD instruction corresponding to the second step of FIG. 5 which is executed subsequent to the calculation of the first step of FIG. 5. The execution process shown in FIG. 10B is similar to that of FIG. 10A except for input data. After execution of the second step, the real part of the output data item Y[0] is held in the register R0, and the imaginary part of the output data item Y[0] is held in the register R1.

Note that the operations of the adder/subtractors 1340 to 1343 included in the complex-MAC unit 23 are controlled by control signals MAD_FNCL[1:0] and MAD_FNCR[1:0] supplied from the execution control section 20 to the complex-MAC unit 23. The table of FIG. 11 shows combinations of control signals supplied from the execution control section 20 to the complex-MAC unit 23 in response to the decoded VCMAD instructions shown in FIGS. 10A and 10B.

Like the microprocessor 1 described above, the microprocessor 2 according to the second embodiment is also characterized by performing two complex multiplications (for example, W[0]*X[0] and W[1]*X[1]) in parallel so as to obtain a single output data item (for example, Y[0]) of the complex-MAC operation, and adding two multiplication results to each other, thereby generating a single output data item. Note that the parallelism of the arithmetic hardware of the complex-MAC unit 23 is increased so that "calculations for obtaining the real part and the imaginary part of sum of two complex products", which are performed by the microprocessor 1 in response to two instructions, can be performed in response to a single instruction.

In this configuration, it is only necessary for the microprocessor 2 to hold two output data items (for example, real part and imaginary part of "W[0]*X[0]+w[1]*x[1]") in two output registers (for example, registers R0 and R1). Meanwhile, to increase the hardware parallelism in the configurations shown in FIGS. 14A and 14B, it is necessary to hold four output data items (for example, real part and imaginary part of W[0]*X[0], and real part and imaginary part of W[0]+*X[1]). By comparing these configurations, it is apparent that the microprocessor 2 has advantages of reducing the amount of data of the MAC operation results to be held in accumulators, and of reducing the size and the number of registers to be prepared so as to avoid the scaling.

Though processing units other than the complex-MAC units 13 and 23 are not shown in FIGS. 1 and 8, the microprocessors 1 and 2 may include other processing units. For example, the microprocessors 1 and 2 may include a floating-point arithmetic unit, an integer arithmetic unit, and a load/store unit.

Further, for example, when each of the registers R0 to R15 has a 128-bit length and when the hardware parallelism of the complex-MAC units 13 and 23 is doubled, the first step and the second step shown in FIG. 5 can be executed in parallel. Thus, the register length of each of the registers R0 to R15 may be increased so as to increase the parallelism of data, and the hardware parallelism of the complex-MAC units 13 and 34 may be further increased.

In the first and second embodiments, the description has been made assuming that the general-purpose register (any of registers R0 to R15) contained in the register file 12 is used as an accumulator to store the complex-MAC operation results, and that the operands of each of the complex-MAC instructions (VCMADRE instruction, VCMADIM instruction, and VCMAD instruction) explicitly specify the accumulator. Alternatively, the accumulator to store the complex-MAC operation results may be a dedicated register provided only for storing the MAC operation results. Further, the accumulator to store the complex-MAC operation results is not necessarily specified explicitly by the operands of the complex-MAC instructions, and the accumulator may be determined in advance.

Further, in the first and second embodiments, the accumulator to store the complex-MAC operation result has a 64-bit length with respect to 32-bit data of the complex multiplication results. Alternatively, only a part of the 64-bit register (for example, 48 bits) may be used for storing the complex multiplication results. Further, the size of the accumulator to store the complex multiplication results may be less than twice the data length of the complex multiplication results. For example, when the maximum data length of the result obtained by adding four complex multiplication results (each having 32-bit length) to each other is 34 bits, the accumulator to store the complex multiplication results may have at least a 34-bit length.

As described above, the configurations of the complex-MAC units 13 and 23 shown in FIGS. 3 and 9, respectively, are only examples, and the configurations of FIGS. 3 and 9 do not limit the hardware configuration of each of the complex-MAC units 13 and 23. For example, the order of addition and subtraction operations performed by the adder/subtractors 1340 and 1341 and the adder 1350 may be appropriately changed, and these components may be integrated into hardware.

Further, in the first and second embodiments, specific examples of relatively simple FIR filter operation assuming that the tap number m is 4 have been described. Alternatively, if the number of times of repeated execution of the VCMADRE instruction and the VCMADIM instruction is increased, or if the number of times of repeated execution of the VCMAD instruction is increased, the microprocessor 1 or 2 can easily perform the FIR filter operation in the case where the tap number m of the FIR filter is further increased.

Furthermore, in the first and second embodiments, the description has been made assuming that, when the complex data such as X[0] and W[0] are stored in any of the registers R0 to R15, the real part of the data is stored on the lower-order bit side of the register, and the imaginary part of the data is stored on the higher-order bit side of the register. In the microprocessors 1 and 2 described in the first and second embodiments, however, the storage order of the complex data is not limited to the order of the imaginary part and the real part. In other words, the microprocessor 1 and 2 can also perform the complex-MAC operation using complex data with the real part and the imaginary part stored in the stated order.

It is apparent that the present invention is not limited to the above embodiments, but may be modified and changed without departing from the scope and spirit of the invention.

What is claimed is:

1. A microprocessor, comprising:
an execution control section configured to fetch instructions containing a complex-MAC instruction to instruct an MAC (multiply-accumulate) operation on complex numbers and to control execution of the instruction;
a first register having a register length of at least $2^{m+1}$ bits and capable of storing first complex data and second complex data each having a $2^m$-bit length and each having a $2^{m-1}$-bit real part and a $2^{m-1}$-bit imaginary part;
a second register having a register length of at least $2^{m+1}$ bits and capable of storing third complex data and fourth complex data each having a $2^m$-bit length and each having a $2^{m-1}$-bit real part and a $2^{m-1}$-bit imaginary part;
a third register having a register length of at least $2^m+2$ bits; and
a complex-MAC unit configured to receive the first to fourth complex data from the first register and the second register so as to perform a complex operation based on control of the execution control section having fetched the complex-MAC instruction, and to overwrite the third register with a value obtained by adding a value obtained through the complex operation to a stored value of the third register,
wherein the value obtained through the complex operation is one of a sum of a real part of a product of the first and third complex data and a real part of a product of the second and fourth complex data, and a sum of an imaginary part of the product of the first and third complex data and an imaginary part of the product of the second and fourth complex data
wherein the complex-MAC unit includes:
a first multiplier configured to multiply one of the real part and the imaginary part of the first complex data by the real part of the third complex data to output a multiplication result with a maximum length of $2^m$ bits;
a second multiplier configured to multiply one of the imaginary part and the real part of the first complex data by the imaginary part of the third complex data to output a multiplication result with a maximum length of $2^m$ bits;
a third multiplier configured to multiply one of the real part and the imaginary part of the second complex data by the real part of the fourth complex data to output a multiplication result with a maximum length of $2^m$ bits;
a fourth multiplier configured to multiply one of the imaginary part and the real part of the second complex data by the imaginary part of the fourth complex data to output a multiplication result with a maximum length of $2^m$ bits;
a first addition/subtraction section configured to alternately perform one of addition and subtraction on four output values of the first to fourth multipliers, and to output a single addition/subtraction result; and
a first cumulative addition section configured to add an output value of the first addition/subtraction section to the stored value of the third resister to output an obtained addition result to the third register,
wherein the first addition/subtraction section includes:
a first adder/subtractor configured to perform one of addition and subtraction on the output values of the first and second multipliers to output one of a real part and a imaginary part of a result of multiplication of the first complex number and the third complex number;
a second adder/subtractor configured to perform one of addition and subtraction on the output values of the third and fourth multipliers to output one of a real part and an imaginary part of a result of multiplication of the second complex number and the fourth complex number; and
a first adder configured to add output values of the first adder/subtractor and the second adder/subtractor,
wherein the complex-MAC instruction comprises one of a real part MAC operation instruction to instruct cumulative addition of real parts of multiplication results of two complex data items, and an imaginary part MAC operation instruction to instruct cumulative addition of imaginary parts of multiplication results of two complex data items;
the complex-MAC unit further includes:
a first selector circuit configured to selectively supply one of the real part and the imaginary part of the first complex data to the first multiplier;
a second selector circuit configured to selectively supply one of the real part and the imaginary part of the first complex data to the second multiplier;
a third selector circuit configured to selectively supply one of the real part and the imaginary part of the second complex data to the third multiplier; and
a fourth selector circuit configured to selectively supply one of the real part and the imaginary part of the second complex data to the fourth multiplier;
the execution control section executes the real part MAC operation instruction by causing:
the first selector circuit to supply the real part of the first complex number;
the second selector circuit to supply the imaginary part of the first complex number;
the third selector circuit to supply the real part of the third complex number;
the fourth selector circuit to supply the imaginary part of the third complex number: and
the first adder/subtractor and the second adder/subtractor to perform subtraction processing; and
the execution control section executes the imaginary part MAC operation instruction by causing:
the first selector circuit to supply the imaginary part of the first complex number:
the second selector circuit to supply the real part of the first complex number;
the third selector circuit to supply the imaginary part of the third complex number;
the fourth selector circuit to supply the real part of the third complex number; and
the first adder/subtractor and the second adder/subtractor to perform addition processing.

2. The microprocessor according to claim 1, wherein the complex-MAC instruction comprises operands to specify each of the first register, the second register, and the third register.

3. The microprocessor according to claim 1, further comprising a fourth register having a register length of at least $2^m+2$ bits, wherein:
the first multiplier multiplies the real part of the first complex data by the real part of the third complex data;
the second multiplier multiplies the imaginary part of the first complex data by the imaginary part of the third complex data;
the third multiplier multiplies the real part of the second complex data by the real part of the fourth complex data;
the third multiplier multiplies the imaginary part of the second complex data by the imaginary part of the fourth complex data; and
the complex-MAC unit includes:
a fifth multiplier configured to multiply the imaginary part of the first complex data by the real part of the third complex data to output a multiplication result with a maximum length of $2^m$ bits;
a sixth multiplier configured to multiply the real part of the first complex data by the imaginary part of the third complex data to output a multiplication result with a maximum length of $2^m$ bits;
a seventh multiplier configured to multiply the imaginary part of the second complex data by the real part of the fourth complex data to output a multiplication result with a maximum length of $2^m$ bits;
an eighth multiplier configured to multiply the real part of the second complex data by the imaginary part of the fourth complex data to output a multiplication result with a maximum length of $2^m$ bits;
a second addition/subtraction section configured to add four output values of the fifth to eighth multipliers to each other to output a single addition/subtraction result; and
a second cumulative addition section configured to add an output value of the second addition/subtraction section to a stored value of the fourth register to output an obtained addition result to the fourth register.

* * * * *